United States Patent [19]

Kiselev

[11] Patent Number: 4,908,051
[45] Date of Patent: Mar. 13, 1990

[54] AXIAL SWIRL DEVICE FOR A CONTACT AND SEPARATION MEMBER

[75] Inventor: Viktor M. Kiselev, Kharkov, U.S.S.R.

[73] Assignee: Ukrainsky Nauchno-Issledovatelsky Institut Prirodnykh Gazov "Ukrniigaz", Kharkov, U.S.S.R.

[21] Appl. No.: 228,697
[22] PCT Filed: Sep. 23, 1986
[86] PCT No.: PCT/SU86/00090
§ 371 Date: May 11, 1988
§ 102(e) Date: May 11, 1988
[87] PCT Pub. No.: WO88/02273
PCT Pub. Date: Apr. 7, 1988
[51] Int. Cl.$^4$ ............................................. B01D 45/12
[52] U.S. Cl. ...................................... 55/457; 261/79.2
[58] Field of Search .................... 55/457, 338, 348; 261/79.2

[56] References Cited

U.S. PATENT DOCUMENTS

| | | | |
|---|---|---|---|
| 3,296,774 | 1/1967 | Hoogendoorn et al. | 55/92 |
| 3,481,120 | 12/1969 | Lustenader | 55/457 |
| 3,605,388 | 9/1971 | Zuiderweg et al. | 55/236 |
| 3,693,329 | 9/1972 | Willis | 55/457 |
| 3,788,282 | 1/1974 | Modrok | 55/348 |

FOREIGN PATENT DOCUMENTS

| | | | |
|---|---|---|---|
| 662645 | 5/1963 | Canada | 55/457 |
| 203622 | 10/1967 | U.S.S.R. | |
| 330875 | 3/1972 | U.S.S.R. | |
| 436677 | 7/1974 | U.S.S.R. | |
| 475160 | 6/1975 | U.S.S.R. | |
| 1123546 | 8/1968 | United Kingdom | |

Primary Examiner—Bernard Nozick
Attorney, Agent, or Firm—Fleit, Jacobson, Cohn, Price, Holman & Stern

[57] ABSTRACT

An axial swirl device for a contact and separation member for mass-exchange and separation apparatuses, having a sleeve (1) which has a closed inlet end and an open outlet end and vanes (2) located on the outer surface of the sleeve to extend at an angle with respect to the longitudinal axis of the sleeve (1) in the zone of its outlet end. A deflector means (6) is provided at the outlet end of the sleeve (1) coaxially therewith. The deflector means (6) is mounted coaxially with the sleeve (1) at the outlet end thereof and made in the form of a body of revolution having the generant of its outer surface which is so shaped that a tangent line drawn to the generant at the point thereof remotest from the vanes (2) extends at an angle of from 0° to 15° with respect to the longitudinal axis of the sleeve (1).

6 Claims, 3 Drawing Sheets

AXIAL SWIRL DEVICE FOR A CONTACT AND SEPARATION MEMBER

TECHNICAL FIELD

The invention relates to the gas-liquid technology, and in particular, it deals with mass-exchange and separation apparatuses for gas-liquid systems, and more specifically, the invention relates to axial swirl devices for contact and separation members.

The invention may be used in apparatuses employed in the gas, chemical, oil, thermal power and other industries for providing equipment for carrying out mass-exchange processes in gas-liquid systems (absorption, desorption and rectification and also in processes of mechanical scrubbing).

The invention may be most effectively used in gasliquid mass-exchange towers and high-pressure separators in which heat- and mass-exchange processes occur with subsequent separation of contacted phases: separation of gas condensate, drops of contacted absorbent or reflux from a vapour and gas carrier flow, mineralized formation water and inhibitors of hydrate formation (glycols or methanol) from a gas flow in plants for the preparation and processing of natural hydrocarbon gases and petroleum gases.

BACKGROUND OF THE INVENTION

There is a problem nowadays in the way of improving efficiency, lowering metal weight and improving reliability and output of mass-exchange towers and gas-liquid separators.

As mass-exchange towers and gas-liquid separators are basic apparatuses used in processes of preparation and processing of gas, bringing a solution to this problem would open the way to providing compact gas processing and separation plants for gas condensate continental shelf deposits and polar regions where low weight, small size and high capacity-to-mass ratio equipment is especially appreciated.

Known in the art is a multiple-vane axial swirl device for separating phases, comprising a coaxial pipe extending through a bunch of solid inclined vanes for gas recirculation in a circuit "deposition zone - reduced pressure zone" in the central area of the tail part of the swirl device (cg. USSR Inventor's Certificate No. 436677, Int.Cl. B 04 C 3/06, publ 25.07.1974).

This swirl device has a large axial size because of an unwieldy recirculation system.

Also known in the art is an axial swirl device for a contact and separation member having vanes with through radial passages (cf. USSR Inventor's Certificate No. 203622, Int.Cl. B 01 d, publ. 9.10.1967). A deflector in the form of a converging tube is provided above, and adjacent to the swirl device for restricting the swirled gas and liquid flow passing therethrough.

This construction allows processes of heat- and mass-exchange and phase separation in gas-liquid systems to be intensified.

However, the converging tube restriction of swirled flow results in increased energy consumption for forcing the flow through while lowering throughput capacity since flow velocity at the outlet edge of the converging tube is limited to a certain value so as to comply with conditions for ensuring reliable separation of contacted gas and liquid phases.

Known in the art is an axial swirl device for centrifugal separation of phases of a gas and liquid mixture (cf. U.S. Pat. No. 3,693,229, Int. Cl. B 01 d 45/12). The swirl device comprises a bunch of inclined vanes secured to a central sleeve, and for recirculation of gas being separated, use is made of a reduced pressure zone created axially along the sleeve of the swirl device, the gas being sucked into the sleeve through passages of individual vanes (hollow vanes). The vane passages may, in certain applications, extend tangentially to the interior of the central sleeve. The sleeve proper has a cigar-like extension downstream the outlet edge of the vanes, with a gradual narrowing of its outer surface through a decrease in the wall thickness to fit the dimensions of the open cylindrical cavity.

This construction of the axial swirl device makes it possible to increase throughput capacity of a contact and separation member in terms of gas as compared with the abovedescribed swirl devices.

However, throughput capacity in terms of liquid remains low in this prior art device because of a weak swirling of liquid drops that break through together with recirculated gas. This weak swirling calls for a considerable distance at which the tail cigar-like portion of the swirl device should be spaced from a separation unit so as to remove the separated liquid film.

In addition, the cigar-like extension of the sleeve of the swirl device enables individual drops passing along its surface to separate at a small distance from the central axis of the swirl device where swirling of the flow is rather ineffectual for reliable separation of phases with substantial liquid flow rates.

Liquid may be accumulate in the interior of the sleeve when the prior art apparatus operation is suspended so that additional amounts of heating steam and hot water are required for removing the liquid during inspection and repairs of the apparatus.

The abovementioned disadvantages of the prior art swirl device impose a preferably horizontal working position, thus restricting the field of application since vertical position of a swirl device is generally desirable in mass-exchange apparatuses.

SUMMARY OF THE INVENTION

It is an object of the invention to provide an axial swirl device for contact and separation members for massexchange and separation apparatuses, wherein, owing to a new structural arrangement of the flow duct, high efficiency of heat- and mass-exchange processes and phase separation is ensured with a reduced axial size of the device.

The invention essentially resides in that an axial swirl device for a contact and separation member for mass-exchange and separation apparatuses, comprising a hollow sleeve having a closed inlet end and an open outlet end on the sides of inlet and outlet of fluid being swirled, respectively, and vanes extending on the outer wall of the sleeve at an angle with respect to the longitudinal axis of the sleeve in the zone of the outlet end thereof, wherein, according to the invention, the device is provided with a deflector means mounted coaxially with the sleeve at the outlet end thereof and comprising a body of revolution having a generant of the outer surface thereof which is so shaped that a tangent line drawn to this generant at the point thereof remotest from the vanes extends at an angle of from 0° to 15° with respect to the longitudinal axis of the sleeve.

This structural arrangement of the deflector means makes it possible to intensify heat- and mass-exchange processes between liquid and gas, first owing to wetting of the surface of the deflector means; second, owing to the tangential direction of drops incident upon its surface; and third, owing to an extension of the active turbulent zone of contact between gas and liquid by the provision of the deflector means. In addition, the deflector means allows the total length of the separation zone to be substantially reduced. This is achieved due to the fact that drops separated from the edge of the deflector means are subjected to a stronger action on the part of centrifugal forces as compared to what occurs in prior art swirl devices owing to a greater distance at which the edge of the deflector means is spaced from the longitudinal axis of the swirl device.

The deflector means is preferably made in the form of a diffuser having its narrow and secured to the sleeve and the flare end of an outside diameter ($D_1$) equal to 0.5–0.7 of the diameter of the circumscribed circle of the vanes (D).

The provision of the deflector means in the form of a diffuser makes it possible to make the swirled jet more stable without appreciable increase in drag by choosing the diameter $D_1$ so as to correspond to the boundary of the central vertical core of the swirled jet. This can be explained as follows. A simplified model of a swirled gas flow is a hollow rotating jet with kinematically and dynamically weak core. If the flare end of a diffuser is equal to the diameter of the central vortex, i.e. if it does not restrict the swirled jet thus formed, there is no appreciable increase in drag. The following useful technical results are thus obtained: a swirled jet is formed which is not liable to damping; processes of heat- and mass-exchange and phase separation in a gas-liquid system are intensified.

Through radial ports preferably made in the sleeve wall which are circumferentially spaced so as to form at least one row of ports.

This structural arrangement of the axial swirl device makes it possible to put in order the removal of liquid entrained with a backward vortical flow or with a recirculation gas flow from the interior of the sleeve thereby preventing liquid from accumulating in the sleeve. In addition, the through radial ports may extend through the body of the vanes so as to define recirculation passages for gas.

The end of the deflector means adjacent to the sleeve may have the inside diameter which is smaller than the inside diameter of the sleeve so as to form a shoulder on the inner surface of the sleeve.

This construction of the axial swirl device allows for a more reliable removal of liquid from the interior of the sleeve, thus preventing entrainment of liquid along the axis of the swirl device.

The radial ports of the swirl device are preferably made between the vanes.

This construction of the swirl device ensures removal of liquid for sprinkling gas-liquid flow moving through the inlined passages thus contributing to a hydrodynamic coagulation of small-size drops, and hence, to a more complete separation of drops from the swirled gas flow.

The radial ports may be made in the outlet end of the sleeve, downstream the outlet ends of the swirl device vanes.

This construction makes it possible to ensure a more intensive removal of liquid through the ports owing to suction thereof by the flow leaving the vanes.

The length of the deflector means is preferably equal to 0.2–1.0 diameter of the circumscribed circle of the swirl device vanes.

This construction ensures the most optimum operation of the swirl device. Changing from small to larger diameter of the swirl device, this ratio generally decreases from 1.0 to 0.2 depending on specific application.

Finally, a streamline member is preferably provided at the inlet end of the sleeve coaxially therewith, a through opening being made in the streamline member wall which is inclined at an acute angle with respect to the sleeve axis and located in the zone of intersection of the inner surface of the streamline member with the sleeve axis.

This construction of the streamline member lowers the admission hydraulic losses, contributes to blowing a spurious vortex off at the axis of the swirl device and also ensures removal and drainage of liquid upon suspension of operation of the apparatus.

BRIEF DESCRIPTION OF THE DRAWINGS

The invention will now be described in detail with reference to accompanying drawings illustrating specific embodiments of the invention, in which.

BEST MODE FOR CARRYING OUT THE INVENTION

Figure 1:
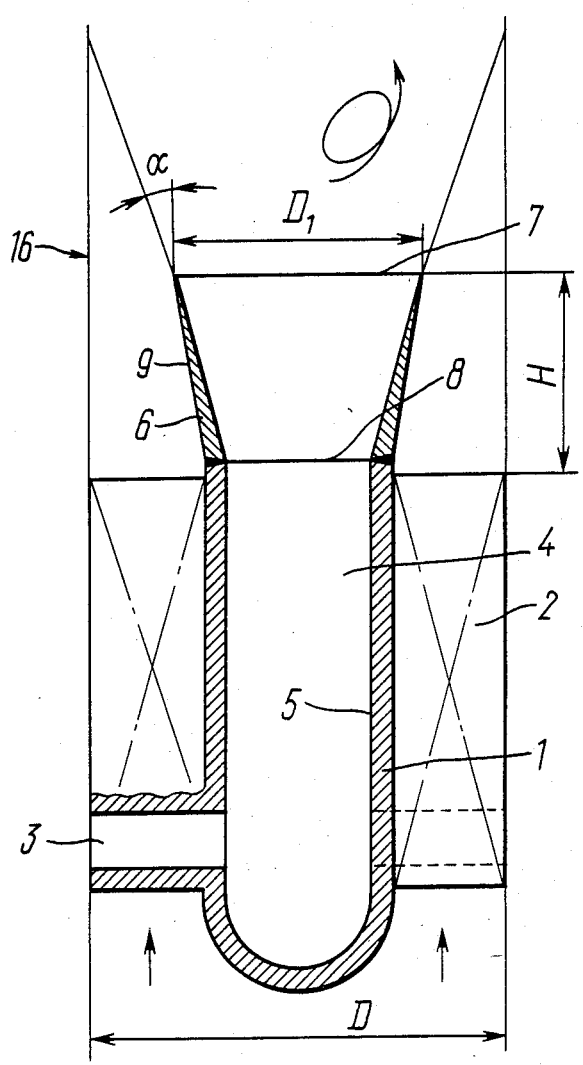
FIG. 1 is a schematic view of an axial swirl device according to the invention, in longitudinal section, with a deflector means in the form of a cone having a straight line generant.

An axial swirl device has a central hollow sleeve 1 (FIG. 1) to which are secured inclined vanes 2 and certain among them may have a passage 3 terminating in the interior 4 and extending in the direction towards the longitudinal axis or tangentially with respect to the surface of the inner wall 5. A deflector means 6 is mounted coaxially with the central sleeve 1 with its outlet edge 7 facing towards the outlet of swirled fluid, the end of the deflector means 8 being secured to the sleeve 1. The deflector means 6 has the outer surface 9 in the form of a body of revolution with a generant in the form of either straight line or a smooth curved line of a shape such that a tangent line to the outer surface of the means 6 at the edge 7 should extend at an angle α of from 0° to 15°.

Figure 2:
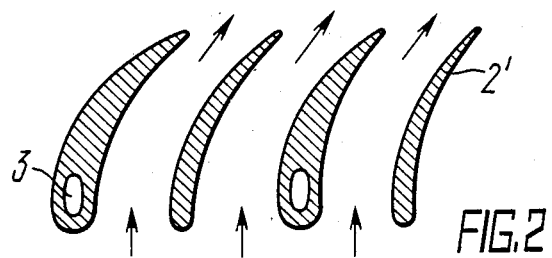
FIG. 2 shows a partial developed view of an axial swirl device in which hollow vanes alternate with solid vanes.

FIG. 2 shows a partial developed view of an embodiment of the axial swirl device in which the hollow vanes 2 having the passages 3 alternate with solid vanes 2'. It should be noted that both configurations of the vanes, their number and position may vary.

Figure 3:
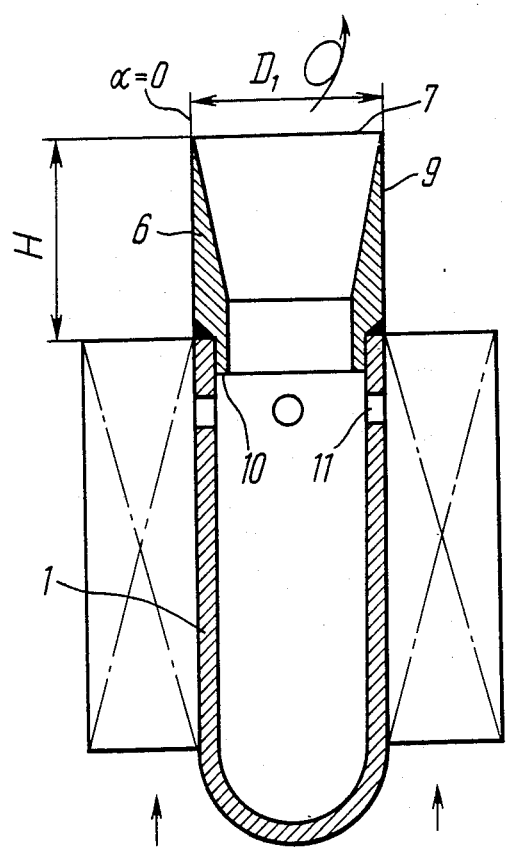
FIG. 3 is an embodiment of a deflector means in the form of a cylindrical extension of a swirl device sleeve with a shoulder on the inner side thereof and with all vanes of the swirl device being sold.

With reference now to FIG. 3, it shows an embodiment of the deflector means 6 in the form of a cylindrical extension of the sleeve 1 of the swirl device. The end 8 of the deflector member 6 is smaller than the inside diameter of the sleeve 1 and defines a shoulder 10, and at least one row of through radial ports 11 are provided under the shoulder, the ports terminating in the intervane zone of the swirl device. A tangent line drawn to the outer surface of the deflector member 6, at the edge 7 thereof, extends in parallel with the longitudinal axis of the sleeve, the angle $\alpha = 0°$, and the diameter $D_1$ is equal to the sleeve diameter.

Figure 4:
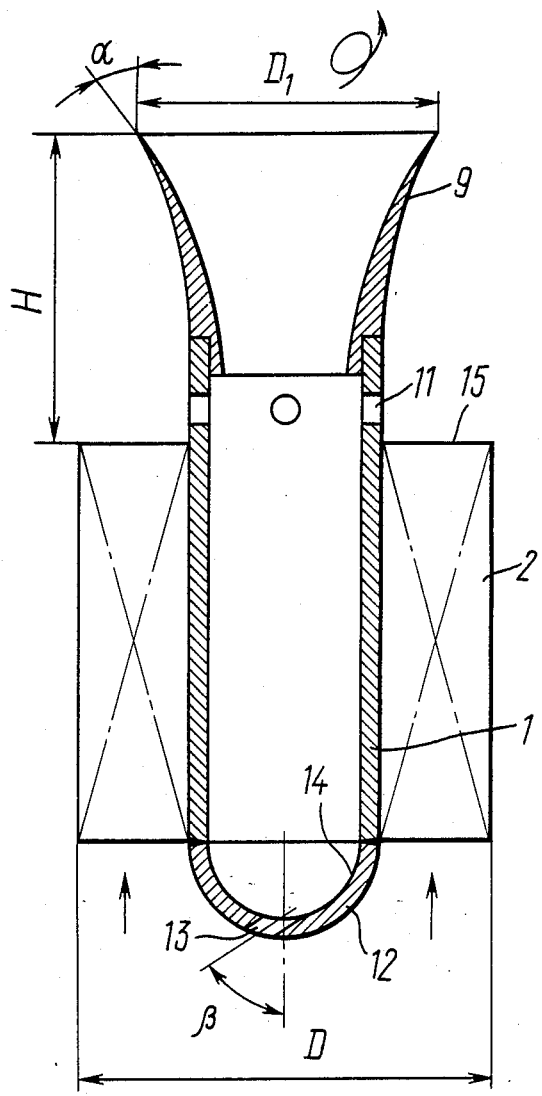
FIG. 4 is an embodiment of a deflector means having a curved line generant, with a streamline member having an opening and with all vanes of the swirl device being solid.

FIG. 4 shows an embodiment of the deflector means 6 having the generant 9 of the outer surface in the form of a curved line, the sleeve 1 having a streamline member 12 secured to the sleeve 1 and having a through opening 13 inlined at an acute angle $\beta$ with respect to the sleeve axis, the opening being located in the zone of intersection of the inner surface 14 of the streamline member with the axis of the sleeve 1. The ports 11 are located downstream the outlet ends 15 of the vanes 2. Curvature and configuration of the generant are chosen to comply with the condition $D_1 = (0.5-0.7)$ D, $\alpha$ not exceeding 15° and the height $H = (0.2-1.0)D$.

FIGS. 1 through 4 show the vertical modification of the swirl device, but it is understood that it can work in horizontal or inclined position as well.

The axial swirl device functions in the following manner.

A flow of liquid drops is directed together with gas towards the swirl device as shown by arrows in the drawings. When the flow passes through the swirl device, it is swirled about the longitudinal axis of the central sleeve 1 and continues to move further in a vortical chamber 16 (the wall of the vortical chamber in FIG. 1 is shown with two dotted lines as an extension of the outer circumscribed surface of the vanes) in the form of a swirled jet. Heat- and mass-exchange processes thus occur between liquid and gas.

A reduced pressure zone is formed in the direction along the longitudinal axis of the swirl device. Gas, which is removed from the separation zone flows naturally together with the entrained liquid drops for recirculation through the passages 3 into the interior 4 wherein pressure is at the minimum and leaves, in the form of a rotating jet, through the end 8 of the deflector means 6. In the simplest case, liquid drops are thrown against the inner wall 5 of the sleeve 1 and then drip down along the deflector 6 towards the edge 7 wherefrom they are stripped off by the swirled jet of fluid along a conical trajectory as shown by inclined dotted lines in FIG. 1.

The outer surface 9 of the deflector 6 is wetted with liquid since liquid drops flying out of the intervane space would slide over the surface 9 thus contributing to intensification of heat- and mass-exchange processes in a gas-liquid system.

For a more reliable separation of drops entrained with the recirculation flow, there are provided the ports 11 (FIG. 3) disposed downstream the shoulder 10. The provision of the ports in the intervane zone results in a less intensive removal of liquid than in the case where the ports are disposed downstream the outlet ends 15 of the vanes 2 (FIG. 4).

The streamline member 12 lowers inlet hydraulic losses, but liquid would accumulate on the inner surface 14 thereof. The inclined through opening 13 is provided for blowing the liquid off towards the center of the vortex. Liquid residues are drained through this opening when operation of the apparatus is suspended.

The axial swirl device according to the invention makes it possible to solve the problem of providing a smallsize contact and separation member for heat- and mass-exchange towers and gas-liquid separators.

INDUSTRIAL APPLICABILITY

The invention allows an axial swirl device to be provided for high-capacity contact and separation members for a large variety of mass-exchange and gas-liquid separators. It may be used in the oil and gas and chemical industries and in thermal power engineering for a wide range of processes where gas-liquid systems should be handled.

I claim:

1. An axial swirl device for a contact and separation member for mass-exchange and separation apparatuses, comprising:

a hollow sleeve having a closed inlet end and an open outlet end respectively on an inlet side and an outlet side of fluid being swirled, vanes located on an outer surface of the sleeve and extending at an angle with respect to the longitudinal axis of the sleeve at the outlet end of said hollow sleeve, a deflector means provided on said hollow sleeve and mounted coaxially with the sleeve at the outlet end thereof and made in the form of a body of revolution having a generant of an outer surface thereof which is so shaped that a tangent line drawn to this surface at the point most remote from the vanes extends at an angle of from 0° to 15° with respect to the longitudinal axis of the sleeve, the end of the deflector means secured to the sleeve having an inside diameter which is smaller than the inside diameter of the sleeve so as to define a shoulder at the inner surface thereof, the length of the deflector means being equal to 0.2-1.0 times the diameter of a circumscribed circle of the vanes, and a streamline member provided at the inlet end of the sleeve coaxially therewith, a through opening being provided in the streamline member wall to extend at an acute angle with respect to the sleeve axis, the through opening being located in the zone of intersection of the inner surface of the streamline member with the sleeve axis.

2. An axial swirl device for a contact and separation member for mass-exchange and separation apparatuses comprising:

a hollow sleeve, one end of said sleeve being closed and disposed on an inlet side of fluid being swirled, the other end of said sleeve being open and disposed opposite to the closed end on an outlet side of fluid being swirled;

vanes located on the outer surface of said sleeve, extending at an angle with respect to the longitudinal axis thereof in proximity to said open end of said sleeve, a swirl chamber defined by a continuation of the circumscribed outer surface of said vanes;

a deflector means mounted inside said swirl chamber in coaxial relation to said sleeve at the open end thereof and made in the form of a body of revolution which is a continuation of the outer surface of said sleeve and which is so shaped that a tangent line to a generant of an outer surface of said body of revolution at the point most remote from said vanes is tilted toward the inner wall of the swirl chamber at an angle of up to 15° with respect to the longitudinal axis of said sleeve, the deflector means comprising a diffuser having a narrow end secured to the sleeve, the vanes having a circumscribed circle and a flared end having an outside diameter equal to 0.5 to 0.7 times the diameter of the circumscribed circle of the vanes.

3. An axial swirl device according to claim 2, in which through radial ports are circumferentially made in the wall of the sleeve such that they form at least one row of ports.

4. An axial swirl device according to claim 3, in which the radial ports are located between the vanes.

5. An axial swirl device according to claim 3, in which the radial ports are made at an end of the sleeve downstream outlet ends of the vanes.

6. An axial swirl device for a contact and separation member for mass-exchange and separation apparatuses comprising:
   a hollow sleeve, one end of said sleeve being closed and disposed on an inlet side of fluid being swirled, the other end of said sleeve being open and disposed opposite to the closed end on an outlet side of fluid being swirled;
   vanes located on the outer surface of said sleeve, extending at an angle with respect to the longitudinal axis thereof in proximity to said open end of said sleeve, a swirl chamber defined by a continuation of the circumscribed outer surface of said vanes;
   a deflector means mounted inside said swirl chamber in coaxial relation to said sleeve at the open end thereof and made in the form of a body of revolution which is a continuation of the outer surface of said sleeve and which is so shaped that a tangent line to a generant of an outer surface of said body of revolution at the point most remote from said vanes is tilted toward the inner wall of the swirl chamber at an angle up to 15° with respect to the longitudinal axis of said sleeve, the vanes having a circumscribed circle and the length of the deflector means being equal to 0.2 to 1.0 times the diameter of the circumscribed circle of the vanes and in which a streamline member is provided at the end of the sleeve in coaxial relation thereto, a through opening being provided in a wall of said streamline member to extend at an acute angle to the sleeve axis, the opening being located in a zone of intersection of the inner surface of the streamline member with the sleeve axis.

* * * * *